US008408610B2

(12) United States Patent
Ieda et al.

(10) Patent No.: US 8,408,610 B2
(45) Date of Patent: Apr. 2, 2013

(54) DOOR HANDLE APPARATUS

(75) Inventors: Kiyokazu Ieda, Kariya (JP); Eiji Mushiake, Chita-gun (JP)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 811 days.

(21) Appl. No.: 12/506,781

(22) Filed: Jul. 21, 2009

(65) Prior Publication Data

US 2010/0019510 A1 Jan. 28, 2010

(30) Foreign Application Priority Data

Jul. 24, 2008 (JP) ................................ 2008-191079

(51) Int. Cl.

| | |
|---|---|
| ***E05C 1/12*** | (2006.01) |
| ***E05C 19/00*** | (2006.01) |
| ***E05C 1/06*** | (2006.01) |
| ***E05B 3/00*** | (2006.01) |
| ***B60P 1/267*** | (2006.01) |

(52) U.S. Cl. ......... 292/336.3; 292/173; 292/1; 292/138; 296/50

(58) Field of Classification Search .................. 292/173, 292/336.3, DIG. 53, DIG. 54, 138, DIG. 30, 292/1; 296/50

See application file for complete search history.

(56) References Cited

U.S. PATENT DOCUMENTS

| | | | | |
|---|---|---|---|---|
| 7,233,080 | B2 | 6/2007 | Garnault et al. | |
| 2002/0041225 | A1* | 4/2002 | Inaba et al. | 340/5.6 |
| 2003/0001729 | A1* | 1/2003 | Ieda et al. | 340/426 |
| 2003/0122556 | A1* | 7/2003 | Sueyoshi et al. | 324/686 |
| 2004/0217601 | A1* | 11/2004 | Garnault et al. | 292/336.3 |
| 2004/0223336 | A1* | 11/2004 | Murakami et al. | 362/501 |
| 2004/0257296 | A1* | 12/2004 | Ieda et al. | 343/872 |
| 2004/0262139 | A1* | 12/2004 | Ieda et al. | 200/341 |
| 2005/0073804 | A1* | 4/2005 | Maruyama et al. | 361/600 |
| 2005/0231364 | A1 | 10/2005 | Nitawaki et al. | |
| 2006/0143857 | A1 | 7/2006 | Freyholdt et al. | |
| 2006/0232378 | A1 | 10/2006 | Ogino et al. | |
| 2007/0024420 | A1* | 2/2007 | Watanabe et al. | 340/5.72 |
| 2007/0115191 | A1 | 5/2007 | Hashiguchi et al. | |
| 2007/0216174 | A1* | 9/2007 | Tanimoto et al. | 292/336.3 |
| 2010/0205780 | A1 | 8/2010 | Ieda et al. | |

FOREIGN PATENT DOCUMENTS

| | | | |
|---|---|---|---|
| JP | 2002-295094 | A | 10/2002 |
| JP | 3502848 | B2 | 3/2004 |
| WO | WO 03/029049 | A2 | 4/2003 |
| WO | WO 03/071067 | A1 | 8/2003 |

(Continued)

*Primary Examiner* — Thomas Beach
*Assistant Examiner* — Nathan Cumar
(74) *Attorney, Agent, or Firm* — Buchanan Ingersoll & Rooney

(57) ABSTRACT

A door handle apparatus includes first and second handle cases constituting a door handle, a rotational-portion extending portion, an operational-portion extending portion, and a lock detection electrode of an electrostatic capacity sensor detecting that a door lock command is inputted, on the basis of a fluctuation of electrostatic capacity. The lock detection electrode includes an upper lock detection electrode and a lower lock detection electrode arranged to face an inner surface of an upper wall and an inner surface of a lower wall, respectively. A first electrode end surface of the upper lock detection electrode and a second electrode end surface of the lower lock detection electrode are formed into different shapes, so that a level of capacitive coupling between the lower lock detection electrode and the outer panel is set to be smaller than a level of capacitive coupling between the upper lock detection electrode and the outer panel.

6 Claims, 8 Drawing Sheets

FOREIGN PATENT DOCUMENTS

| | | | |
|---|---|---|---|
| WO | WO 03/071068 | A1 | 8/2003 |
| WO | WO 2006/069633 | A1 | 7/2006 |
| WO | WO 2009/017048 | A1 | 2/2009 |
| WO | WO 2009/017049 | A1 | 2/2009 |

* cited by examiner

DOOR HANDLE APPARATUS

CROSS REFERENCE TO RELATED APPLICATIONS

This application is based on and claims priority under 35 U.S.C. §119 to Japanese Patent Application 2008-191079, filed on Jul. 24, 2008, the entire contents of which is incorporated herein by reference.

FIELD OF THE INVENTION

The present invention relates to a door handle apparatus having a function of detecting a command for locking a vehicle door and the like.

BACKGROUND

A door handle apparatus, on which a Smart Entry System (trademark) is mounted, is known, in which, for example, it is recognized that a user approaches a vehicle or that the user gets out of the vehicle, on the basis of a communication between a portable device, carried by the user, and a transmission device of the vehicle, while it is detected that a door lock command or a door unlock command is inputted by the user relative to a vehicle door in order to automatically execute locking and unlocking operations. Such door handle apparatus is disclosed in JP3502848A.

As illustrated in FIGS. 9 and 10, according to the door handle apparatus disclosed in JP3502848A, an unlock sensor $S_{ULK}$ for detecting an unlock command of a user is arranged at a holding portion 110, at which a hand of the user may be inserted between an outer panel 200 of a vehicle door and a door handle 100. Further, a lock sensor $S_{LK}$ for detecting a lock command of the user is arranged at an operational-portion extending portion 120, the operational-portion extending portion 120 being arranged at the door handle 100 to be adjacent to the holding portion 110 and extending from a portion for operating an opening and closing mechanism of the vehicle door. The lock sensor $S_{LK}$ and the unlock sensor $S_{ULK}$ are electrostatic capacitance sensors, which detect a fluctuation of the electrostatic capacitance. The lock sensor $S_{LK}$ and the unlock sensor $S_{ULK}$ detect the fluctuation of the electrostatic capacitance, which is generated when the hand of the user approaches a vicinity of each detection electrode of the lock sensor $S_{LK}$ and the unlock sensor $S_{ULK}$, and thereby determining that the lock command or the unlock command are inputted. More specifically, a value of electrostatic capacity $C_{PANEL}$, which is established between the outer panel 200 of the vehicle door and the detection electrode of the lock sensor $S_{LK}$, is set as a standard value, and when a value of electrostatic capacity detected by the lock sensor $S_{LK}$ does not fluctuate for a great extent from the value of electrostatic capacity $C_{PANEL}$, it is determined that the unlock command is not inputted. When the hand of the user approaches the vicinity of the detection electrode, another electrostatic capacity $C_T$ is established between the detection electrode and the hand of the user so as to be in parallel with the electrostatic capacity $C_{PANEL}$ (i.e., $C_{PANEL}+C_T$). Therefore, when the value of the electrostatic capacity, detected by the lock sensor $S_{LK}$, is increased by a level corresponding to the value of electrostatic capacity $C_T$, it is determined that the lock command is inputted. The detection principle may be applied to the unlock sensor $S_{ULK}$. According to the door handle apparatus disclosed in JP3502848A, the lock sensor $S_{LK}$ and the unlock sensor $S_{ULK}$ are arranged at different portions of the door handle 100. Therefore, the lock command and the unlock command are detected in response to an operation of the user who touches the different portions of the door handle 100.

According to the door handle apparatus disclosed in JP3502848A, however, as illustrated in FIG. 10, a lock detection electrode (the lock sensor $S_{LK}$) is arranged at an end portion of an outer surface of the holding portion 110 (i.e., a surface of the holding portion 110 opposite from the outer panel 200). Therefore, when the user inserts his/her hand between the holding portion 110 and the outer panel 200 in order to unlock the vehicle door, and then pulls the door handle 100 in order to open the vehicle door, the user may accidentally touch a detection area of the lock sensor $S_{LK}$ with his/her hand. In such a case, both of the unlock command of the unlock sensor $S_{LK}$ and the lock command of the lock sensor $S_{LK}$ may be outputted simultaneously, and an appropriate command may not be inputted. Further, the user may touch the detection area of the lock sensor $S_{LK}$ with his/her hand when the vehicle door is opened, and thereby a locking operation may be unintentionally executed. Thus, an operation, which is not intended by the user, may be executed.

A need thus exists for a door handle apparatus, which is not susceptible to the drawback mentioned above.

SUMMARY OF THE INVENTION

According to an aspect of the present invention, a door handle apparatus for a vehicle includes a door handle including a first handle case and a second handle case, the first handle case having a holding portion for holding the door handle, the holding portion being arranged to be distant from an outer surface of an outer panel of a vehicle door by a clearance, the second handle case serving as an outer portion of the door handle and being arranged to cover the first handle case;

a rotational-portion extending portion provided in the vicinity of one end portion of the door handle in a longitudinal direction thereof and extending into the outer panel after passing therethrough to connect a rotational portion that is rotatably supported by a supporting member inside the outer panel; and an operational-portion extending portion formed in the vicinity of the other end portion of the door handle in the longitudinal direction thereof and extending into the outer panel after passing therethrough to connect an operational portion operating an opening and closing mechanism of the vehicle door, the operational-portion extending portion being provided with a lock detection electrode of an electrostatic capacity sensor, the lock detection electrode being arranged to face an inner surface of the second handle case facing the outer panel, the electrostatic capacity sensor detecting that a door lock command is inputted, on the basis of a fluctuation of electrostatic capacity, wherein the lock detection electrode includes an upper lock detection electrode and a lower lock detection electrode arranged to face an inner surface of an upper wall of the second handle case facing the outer panel and an inner surface of a lower wall of the second handle case facing the outer panel, respectively, and wherein a first electrode end surface of the upper lock detection electrode and a second electrode end surface of the lower lock detection electrode, each of which faces the outer panel, are formed into different shapes from each other, so that a level of capacitive coupling established between the lower lock detection electrode and the outer panel is set to be smaller than a level of capacitive coupling established between the upper lock detection electrode and the outer panel.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of a door handle apparatus, on which a Smart Entry System (trademark) is mounted, will be described hereinafter with reference to the attached FIGS. 1 to 7.

Figure 1:
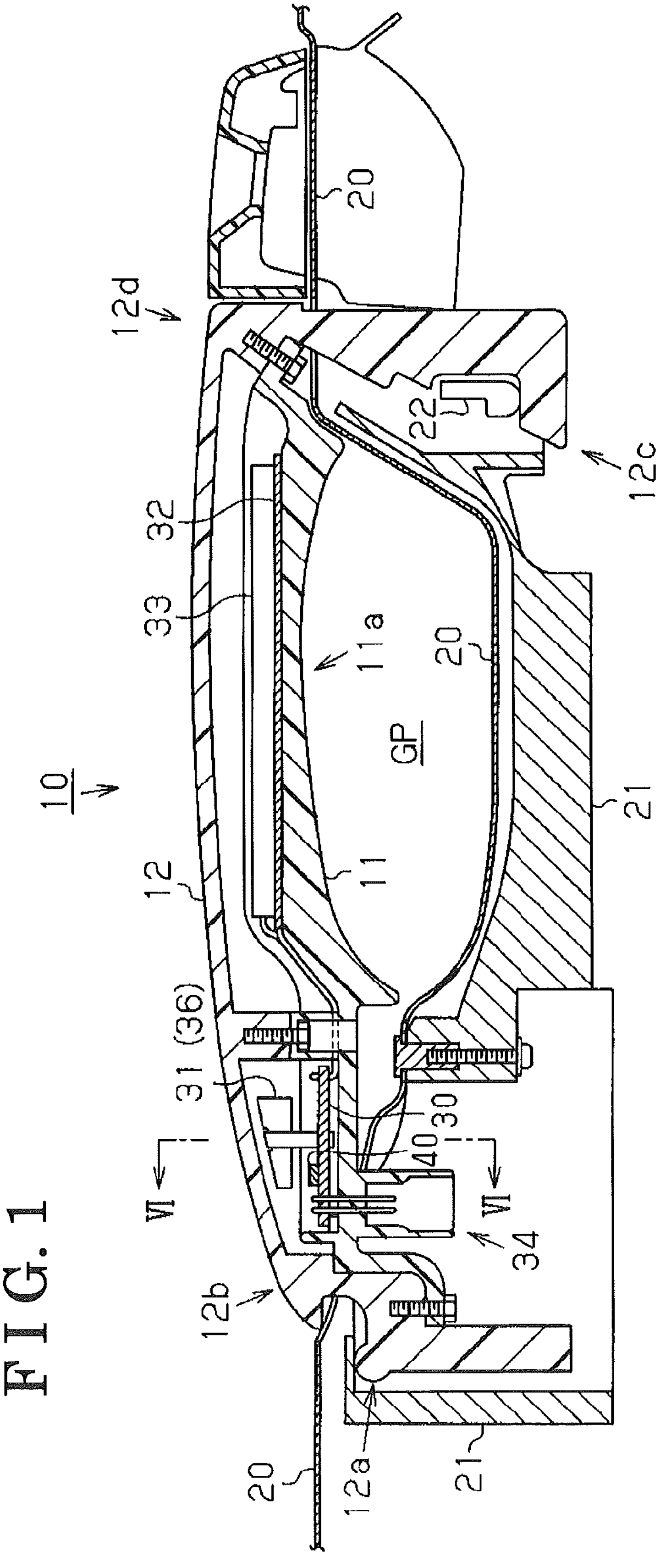
FIG. 1 is a cross-sectional view illustrating a configuration of a door handle apparatus according to an embodiment taken along line I-I (i.e., middle line m) in FIG. 2.

As illustrated in FIG. 1, a door handle 10 of the door handle apparatus is configured by a splitable body, which may be split into two portions including a first handle case 11 and a second handle case 12. The first handle case 11 includes a holding portion 11*a* for holding the door handle 10, arranged to be distant away from an outer surface of an outer panel 20 of a vehicle door by a clearance GP. The second handle case 12 serves as an outer portion of the door handle 10 and is connected to the first handle case 11 by means of screws and the like, so as to cover the first handle case 11. The door handle 10 is configured by a splitable body, which may be split into two portions so that the door handle 10 is designed and manufactured more freely and more easily. Both of the first and second handle cases 11 and 12 are made of highly-rigid resin.

The second handle case 12 includes a rotational-portion extending portion 12*b*, provided in the vicinity of one end portion of the handle case 12 in a longitudinal direction of the door handle 10, and extends so as to penetrate through the outer panel 20 of the vehicle door from a rotational portion 12*a*. The rotational portion 12*a* is rotatably supported by a supporting member 21, which is provided at an inner side of the outer panel 20. Likewise, the second handle case 12 further includes an operational-portion extending portion 12*d*, provided in the vicinity of the other end portion of the second handle case 12 being more distant from the rotational-portion extending portion 12*b* than the holding portion 11*a* in the longitudinal direction of the door handle 10, and extending so as to penetrate through the outer panel 20 from an operational portion 12*c*. The operational portion 12*c* used for operating a lever 22 of a door opening and closing mechanism, which is arranged at the inner side of the outer panel 20. When a user pulls the door handle 10 in a manner of holding the holding portion 11*a*, the door handle 10 is pivoted about the rotational-portion extending portion 12*b* in a direction where the operational-portion extending portion 12*d* is pulled out, Consequently, unless the vehicle door is in a locked state, the lever 22 is operated by means of the operational portion 12*c*, and thereby the vehicle door is opened.

Figure 2:
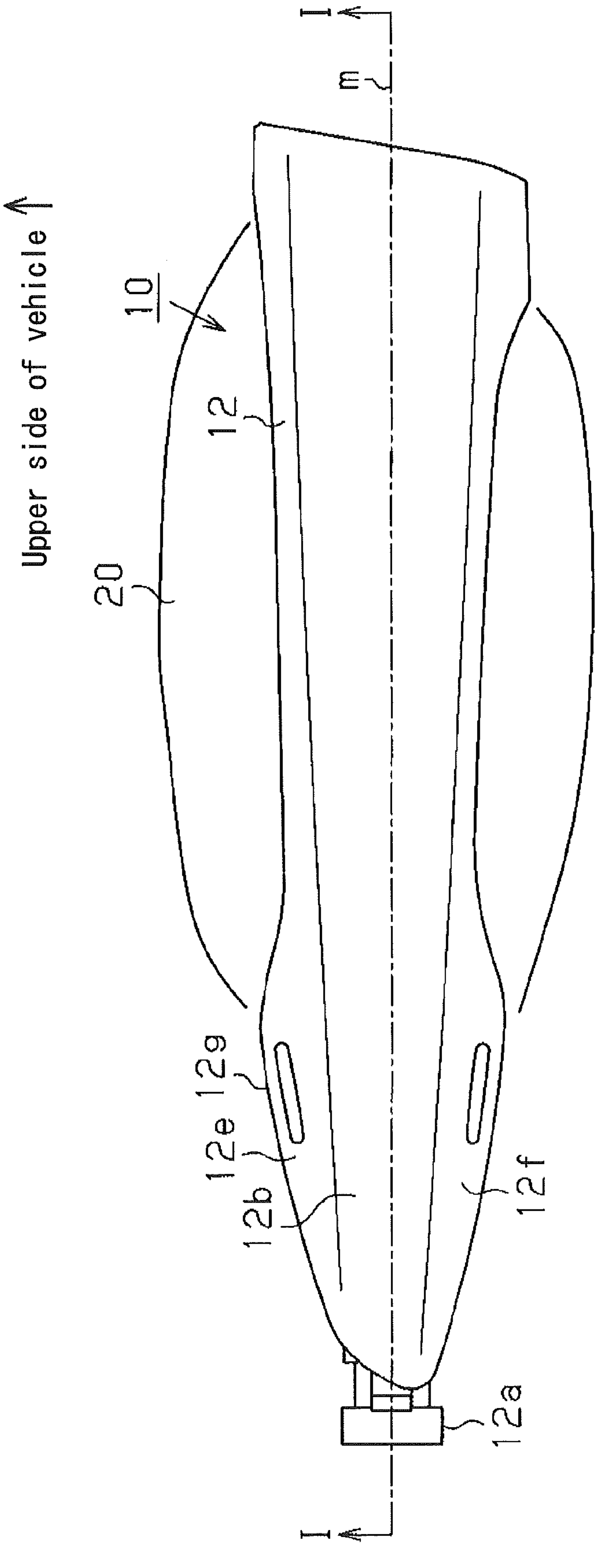
FIG. 2 is a front view illustrating the configuration of the door handle apparatus according to the embodiment, when seen from a side where the door handle apparatus is mounted (i.e., a side of a vehicle)

A middle line m is set along a longitudinal direction of a portion extending from the rotational-portion extending portion 12*b* to the operational-portion extending portion 12*d*. As illustrated in FIG. 2, an upper wall 12*e* and a lower wall 12*f* of the second handle case 12 is formed to be asymmetrical to each other relative to the middle line ("upper" and "lower" used hereinafter correspond to an upper and lower direction (or vertical direction) of the vehicle, respectively). An uneven-shaped serration 12*g* is formed on surfaces of the upper and lower walls 12*e* and 12*f* of the second handle case 12, though detailed description of a configuration of the serration 12*g* using a diagram is not provided. The serration 12*g* guides a water drop W, which may fall on surfaces of upper and lower walls 12*e* and 12*f* of the second handle case 12 due to rain and the like, to flow easily. The serration 12*g* also serves as a marking.

A circuit substrate 30, on which electric components are mounted, is assembled on a surface of the first handle case 11 facing the second handle case 12 and is arranged between the holding portion 11*a* thereof and the rotational-portion extending portion 12*b* of the second handle case 12. A lock detection electrode 31 of a first electrostatic capacity sensor 41 (an electrostatic capacity sensor) is electrically connected to the circuit substrate 30. The first electrostatic capacity sensor 41 detects a command for locking the vehicle door (i.e., the command for locking the vehicle door is inputted in response to an operation of the user having an intention of locking the vehicle door) on the basis of fluctuation of the electrostatic capacity. The lock detection electrode 31 is arranged so as to face an inner surface of the second handle case 12. The lock detection electrode 31 integrally includes an upper lock detection electrode 36 and a lower lock detection electrode 37, which are arranged between the holding portion 11*a* and the rotational-portion extending portion 12*b* so as to face inner surfaces of the upper and lower walls 12*e* and 12*f* of the second handle case 12, respectively. "Inner surface of the second handle case 12 (the upper and lower walls 12*e* and 12*f*)" used hereinafter refer to a surface of the second handle case 12 (the upper and lower walls 12*e* and 12*f*) facing the outer panel 20 of the vehicle door.

An unlock detection electrode 32 of a second electrostatic capacity sensor 42 is provided at an inner surface of the holding portion 11*a* of the first handle case 11 facing the second handle case 12. The second electrostatic capacity sensor 42 detects a command for unlocking the vehicle door on the basis of fluctuation of the electrostatic capacity (i.e., the command for unlocking the vehicle door is inputted in response to an operation of the user having an intention of unlocking the vehicle door). The unlock detection electrode 32 is electrically connected to an electrode, which is mounted on the circuit substrate 30 so as to serve as a sensor input terminal. Further, an antenna 33 is provided in the vicinity of the inner surface of the holding portion 11*a* of the first handle case 11. Information signals are transmitted between a portable device carried by the user and a door control portion 60 via the antenna 33 in order to authenticate the user, for example. The antenna 33 is electrically connected to an electrode, which is mounted on the circuit substrate 30 so as to serve as a feed terminal. Further, the antenna 33 and a sensor IC 40, which is connected to each of the first and second electrostatic capacity sensors 41 and 42 and is mounted on the circuit substrate 30, are supplied with electricity via a connector 34, which is provided at a back surface of the circuit substrate 30, while information signals outputted by the sensor IC 40 are inputted into the door control portion 60 via the connector 34.

A detailed description of a configuration of the lock detection electrode 31 will be described hereinafter with reference to FIGS. 3 and 4.

Figure 3:
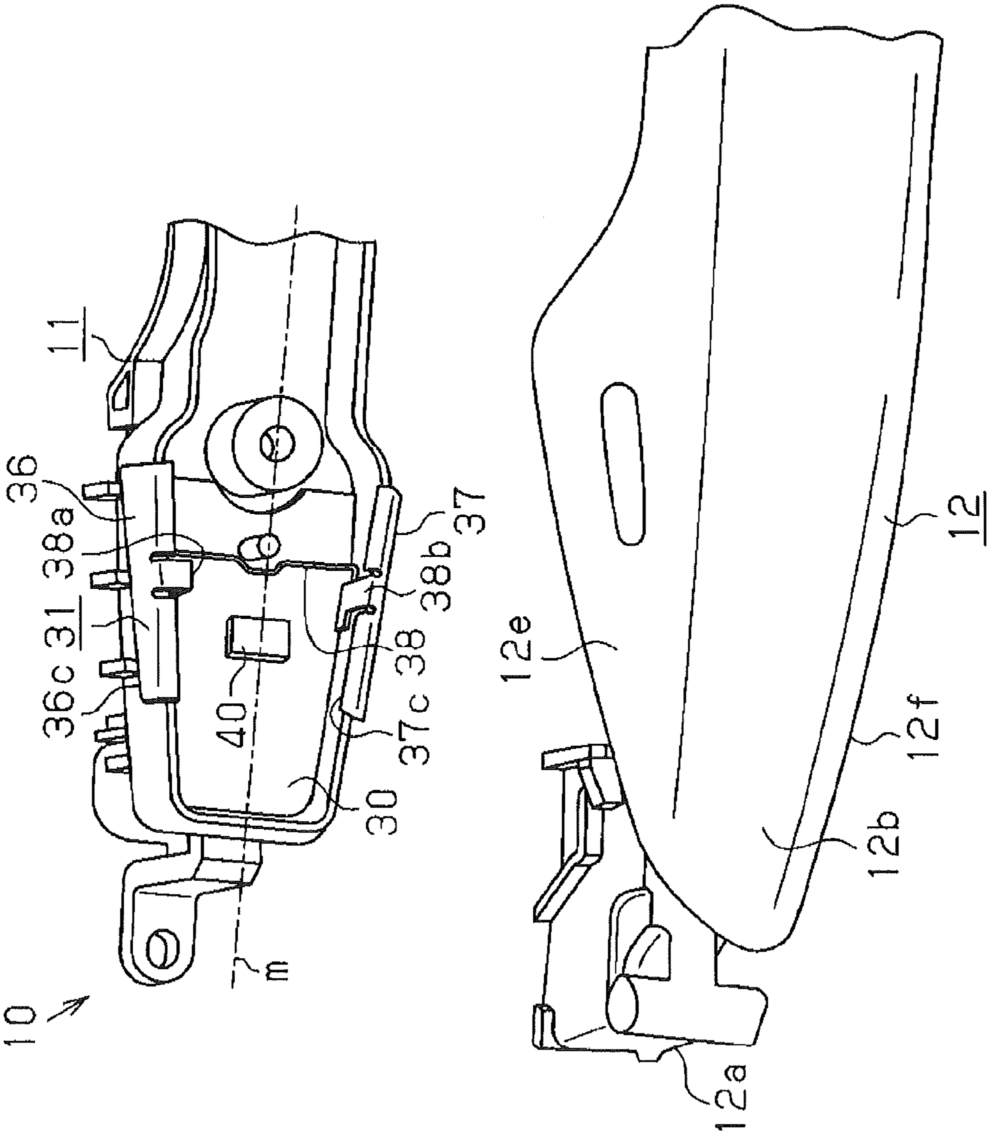
FIG. 3 is an exploded perspective view illustrating a portion of the door handle apparatus according to the embodiment extending from a rotational-portion extending portion to a holding portion.
Figure 4:
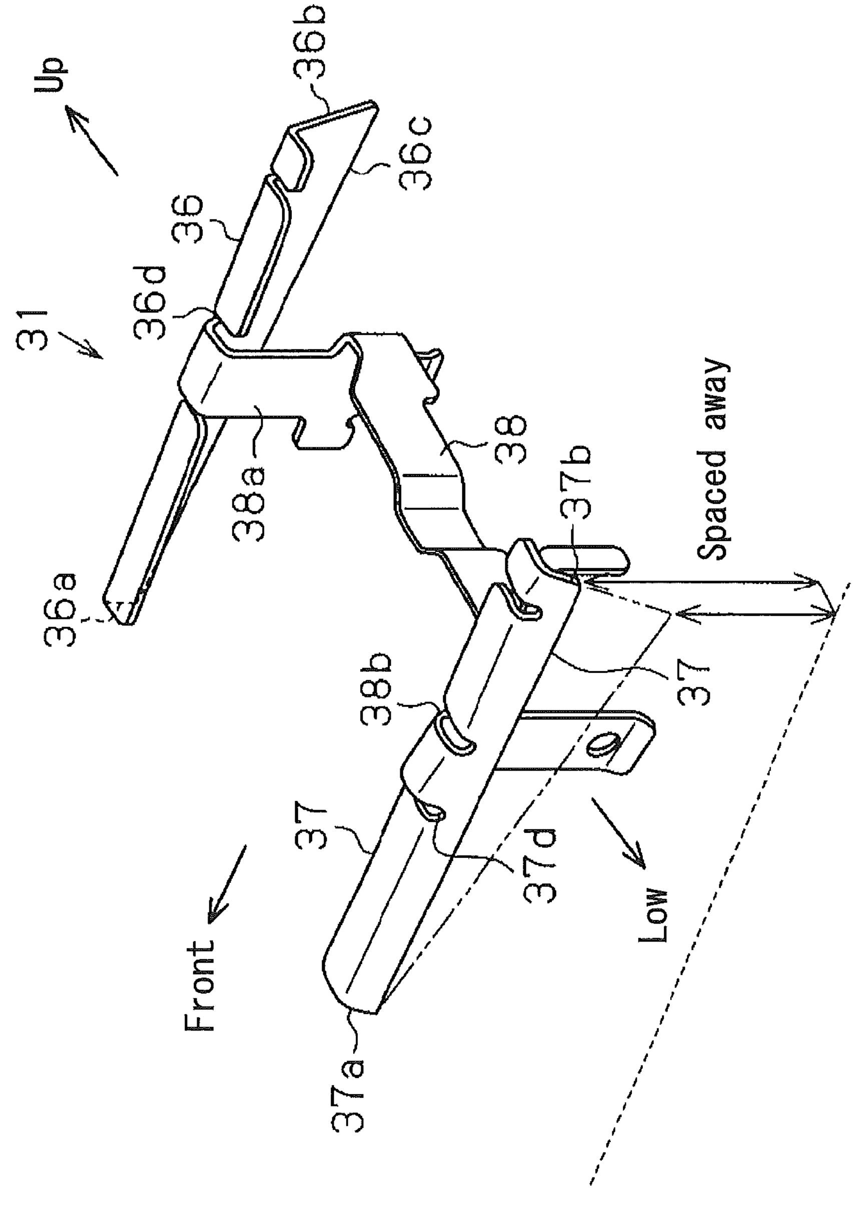
FIG. 4 is a perspective view illustrating a lock detection electrode of the door handle apparatus according to the embodiment.

As illustrated in FIG. 3, the upper lock detection electrode 36 and the lower lock detection electrode 37 of the lock detection electrode 31 are formed to be asymmetrical to each other relative to the above-mentioned middle line m of the door handle 10. More specifically, as illustrated in FIG. 4, the upper lock detection electrode 36 is formed in a substantially trapezoid shape having a first short side 36*a* and a second short side 36*b* that is longer than the first short side 36*a*, at front and rear sides of the vehicle, respectively. On the other hand, the lower lock detection electrode 37 is formed into a substantially rectangular shape (i.e., the substantially rectangular shape is formed in a manner where a triangular-shaped end portion of a substantially trapezoid shape illustrated by a double-dashed line in FIG. 4 facing the outer panel 20 is cut out) having a third short side 37*a* and a fourth short side 37*b* at the front and rear side of the vehicle, respectively. A first electrode end surface 36*c* and a second electrode end surface 37*c*, which respectively serve as longitudinal sides of the upper and lower lock detection electrodes 36 and 37, and which face the outer panel 20, are formed into different shapes from each other. The upper and lower lock detection electrodes 36 and 37 are formed so that a distance between the outer panel 20 and the second electrode end surface 37*c* is longer than a distance between the outer panel 20 and the first electrode end surface 36*c*. Therefore, a level of capacitive coupling established between the outer panel 20 and the second electrode end surface 37*c* of the lower lock detection electrode 37 is smaller than a level of capacitive coupling established between the outer panel 20 and the first electrode end surface 36*c* of the upper lock detection electrode 36 by a level corresponding to a difference in distance between the outer panel 20 and each of the first and second electrode end surfaces 36*c* and 37*c*.

The lock detection electrode 31 includes a plate-shaped connecting portion 38, which extends uprightly from the circuit substrate 30 for a predetermined height. A first end portion 38*a* and a second end portion 38*b* of the connecting portion 38 are bent so as to extend further uprightly from to the circuit substrate 30, and are connected to a first base end portion 36*d* of the upper lock detection electrode 36 and a second base end portion 37*d* of the lower lock detection electrode 37, respectively. Accordingly, the upper lock detection electrode 36 and the lower lock detection electrode 37 are integrally connected to each other via the connecting portion 38.

A detection principle and an operation with respect to a door lock will be described hereinafter with reference to FIG. 5.

Figure 5:
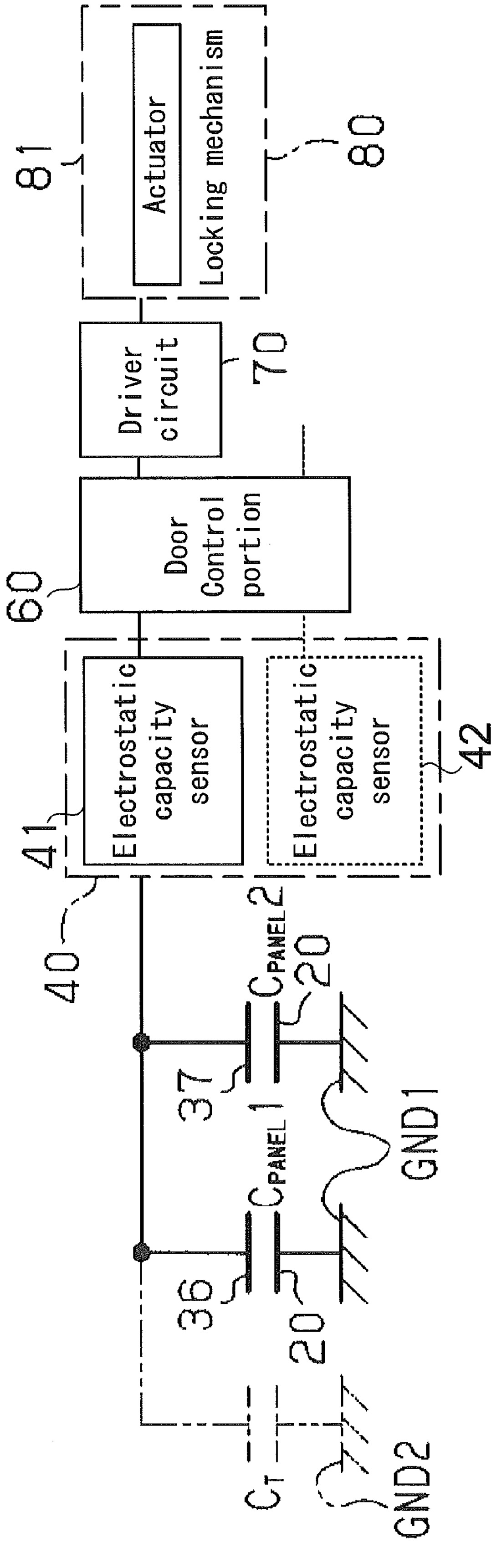
FIG. 5 is a block diagram illustrating a configuration of an equivalent circuit and a door lock system of the door handle apparatus according to the embodiment.

As illustrated in FIG. 5, according to the door handle apparatus shown in FIG. 1, the capacitive coupling, having a value of electrostatic capacity $C_{PANEL}$ 1, is established between the upper lock detection electrode 36 and the outer panel 20 of the vehicle door, serving as a first ground GND1, while the capacitive coupling, having an electrostatic capacity value $C_{PANEL}$ 2, is established between the lower lock detection electrode 37 and the outer panel 20 of the vehicle door, serving as the first ground GND1. A sum of the values of the electrostatic capacity $C_{PANEL}$ (i.e., $C_{PANEL}=C_{PANEL}$ 1+$C_{PANEL}$ 2) is inputted into the first electrostatic capacity sensor 41, which is connected to the sensor IC 40 via the lock detection electrode 31.

When the user touches a portion of the second handle case 12 of the door handle 10, facing to the lock detection electrode 31 (the upper lock detection electrode 36 and the lower locking operation detecting operation 37) with his/her hand, another capacitive coupling, having a value of electrostatic capacity $C_T$, is established between the lock detection electrode 31 and the user, which serves as a second ground GND2, so as to be electrically in parallel with the above-described capacitive coupling, having the values of electrostatic capacity $C_{PANEL}$ 1 and $C_{PANEL}$ 2. A sum of the values of electrostatic capacity ($C_{PANEL}+C_T$) is inputted into the first electrostatic capacity sensor 41. Consequently, the first electrostatic capacity sensor 41 detects that the command for locking the vehicle door is inputted, on the basis of the fact that the inputted sum of the electrostatic capacity is increased from the value of the electrostatic capacity $C_{PANEL}$ 1 by the value of electrostatic capacity $C_T$. When the first electrostatic capacity sensor 41 detects that the command for locking the vehicle door is inputted, the door control portion 60 determines that the command for locking the vehicle door is inputted in response to an operation of the user, on the basis of the detection signal inputted into the first electrostatic capacity sensor 41. Consequently, the door control portion 60 controls to drive an actuator 81 for locking the vehicle door, which is provided at a locking mechanism 80, via a driver circuit 70, and thereby the vehicle door is locked. The above-described detection principle and the operation may be applied to an unlocking system, in which the vehicle door is unlocked by means of the unlock detection electrode 32 together with the second electrostatic capacity sensor 42, embedded in the sensor IC 40. As described above, in the door handle apparatus according to the embodiment, the lock detection electrode 31 is arranged so as to face the inner surfaces of the upper and lower walls 12*e* and 12*f* of the second handle case 12. Therefore, even when the user holds the door handle, the command for locking the vehicle door may not be inputted in response to the holding operation of the door handle 10 by the user. In other words, an operational error may not occur with respect to a door lock operation of the user.

Figure 6:
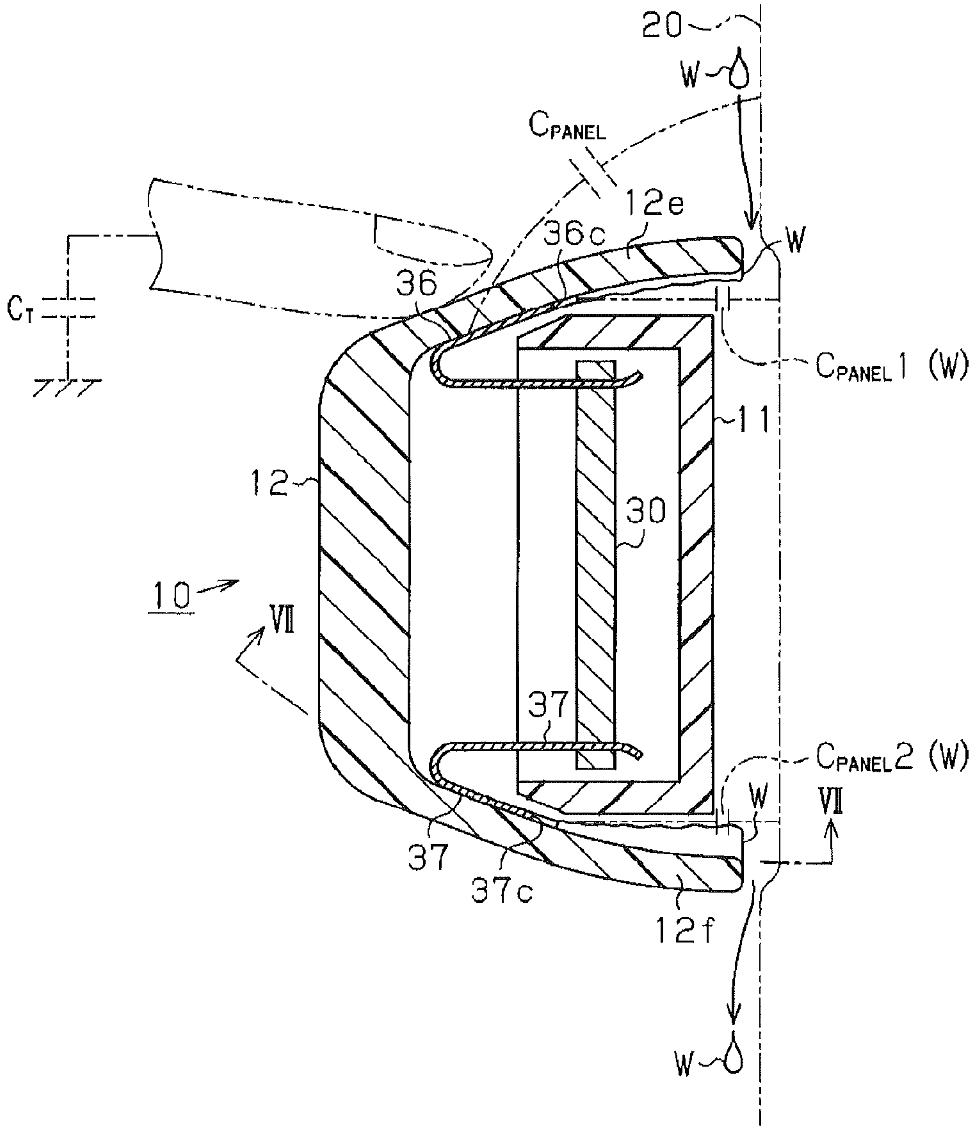
FIG. 6 is a cross-sectional view illustrating the configuration of the door handle apparatus taken along line VI-VI in FIG. 1.

As described above, the lock detection electrode 31 (the upper lock detection electrode 36 and the lower lock detection electrode 37) is arranged so as to face the upper and lower walls 12*e* and 12*f* of the second handle case 12. Further, a case of the door handle 10 is configured by the splitable body, which may be split into the first and second handle cases 11 and 12. Accordingly, the following issue may not be ignored. As illustrated in FIG. 6 with a cross-sectional view taken along line VI-VI in FIG. 1, a space portion generated between the outer panel 20 and each of the first and second electrode end surfaces 36*c* and 37*c* of the upper and lower lock detection electrodes 36 and 37 becomes narrower when each detection range of the upper and lower lock detection electrodes 36 and 37 is expanded. Therefore, the water drop W may easily flow into the space portion generated between the outer panel 20 and each of the electrode end surfaces 36*c* and 37*c* of the upper and lower lock detection electrodes 36 and 37. Further, because the case of the door handle 10 is configured by the splitable body, which may be split into the two portions, the water drop W may approach a vicinity of (i.e., come in contact with) the upper and lower lock detection electrodes 36 and 37. In a case where the water drop W approaches the vicinity of (i.e., comes in contact with) the upper and lower lock detection electrodes 36 and 37, electrostatic capacitive components $C_{PANEL}$ 1 (W) and $C_{PANEL}$ 2 (W) may be increased because electric permittivity of dielectric body is increased at a portion between the outer panel 20 and each of the upper and lower lock detection electrodes 36 and 37 (more specifically, at a shortest facing portion), where capacitive coupling is established. The "shortest facing portion" mentioned hereinafter refers to a portion where the outer panel 20 and each of the upper and lower lock detection electrodes 36 and 37 face each other and a distance therebetween is shortest. Because the water drop W may flow from upper to lower portions of the door handle 10, water may accumulate at an inside of the lower portion of the door handle 10, and therefore, the electrostatic capacitive component $C_{PANEL}$ 2 (W) may be increased. Consequently, the increased electrostatic capacitive component $C_{PANEL}$ 2 (W) may become a major part of the electrostatic capacity $C_{PANEL}$, which is established between the lock detection electrode 31 and the outer panel 20, and as a result, the first electrostatic capacity sensor 41 may malfunction in response to an unintended command for locking the vehicle door.

Figure 7:
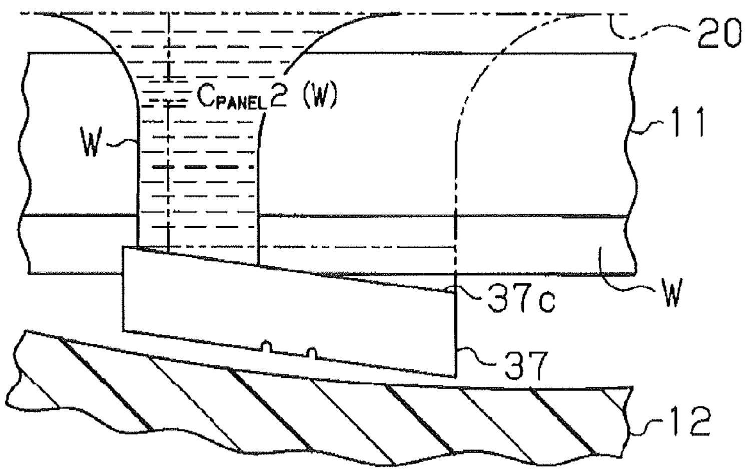
FIG. 7 is a cross-sectional view illustrating the configuration of the door handle apparatus taken along line VII-VII in FIG. 6.

On the other hand, in the door handle apparatus according to the embodiment, the upper and lower lock detection electrodes 36 and 37 are arranged in a manner where the distance between the outer panel 20 and the second electrode end surface 37*c* is longer than the distance between the outer panel 20 and the first electrode end surface 36*c*. Therefore the level of the capacitive coupling established between the outer panel 20 and the second electrode end surface 37*c* of the lower lock detection electrode 37 is set to be smaller than the level of the capacitive coupling established between the outer panel 20 and the first electrode end surface 36*c* of the upper lock detection electrode 36. Accordingly, as illustrated in FIG. 7 with a cross-sectional view taken along line VII-VII in FIG. 6, when the water drop W flows into the space portion between the outer panel 20 and the second electrode end surface 37*c* of the lower lock detection electrode 37, the water drop W is less likely to form a bridge between the outer panel 20 and the second electrode end surface 37*c*, because the second electrode end surface 37*c* is distant away from the outer panel 20 for a longer distance. Consequently, even when the water drop W approaches the vicinity of (i.e., comes in contact with) the lower lock detection electrode 37, the electrostatic capacitive component $C_{PANEL}$ 2 (W) may not be increased. In other words, a sufficient clearance is provided for allowing the fluctuation of the electric permittivity at the shortest facing portion between the outer panel 20 and the lower lock detection electrode 37 and the fluctuation of the electrostatic capacity, which may be caused by ingress of the water drop W, and the like. As a result, the ingress of the water drop W does not cause the first electrostatic sensor 41 to malfunction.

As described above, the following effects may be obtained in the door handle apparatus according to the embodiment.

The lock detection electrode 31 is arranged at the inner surfaces of the upper and lower walls 12*e* and 12*f* of the second handle case 12. Therefore, the command for locking the vehicle door may not be inputted in response to the holding operation of the door handle 10 by the user. More specifically, when the user holds the upper and lower walls 12*e* and 12*f* of the second handle case 12 between his/her fingers in order to input the command for locking the vehicle door, the command for locking the vehicle door is detected because dimensions of the detection area of the upper and lower lock detection electrodes 36 and 37 are sufficiently obtained. Further, because the water drop W flows from the upper to the lower portions of the door handle 10, the water drop W may easily accumulate at the lower portion of the door handle 10. However, the upper and lower lock detection electrodes 36 and 37 are formed into the different shapes from each other, so that the capacitive coupling established between the second electrode end surface 37*c* and the outer panel 20 is smaller than the capacitive coupling established between the first electrode end surface 36*c* and the outer panel 20. In other words, the upper and lower lock detection electrodes 36 and 37 are formed so that the distance between the outer panel 20 and the second electrode end surface 37*c* is set to be greater than the distance between the outer panel 20 and the first electrode end surface 36*c*. Therefore the water drop W is less likely to form the bridge between the outer panel 20 and the second electrode end surface 37*c*, compared to the first electrode end surface 36*c*. Accordingly, the sufficient clearance is provided for allowing the fluctuation of the electric permittivity at the shortest facing portion between the outer panel 20 and the lower lock detection electrode 37 and the fluctuation of the electrostatic capacity, which may be caused when the water drop W approaches (i.e., comes in contact with) the lower lock detection electrode 37. Thus, the water drop W is less likely to form the bridge between the outer panel 20 and the second electrode end surface 37*c*, at the lower lock detection electrode 37, which may be more likely to be affected by the water drop W. Accordingly, the first electrostatic capacity sensor 41 may not malfunction due to the water drop W. Further, the above-described effects are not limited to be obtained relative to the water drop W caused by rain, and the similar effects may be obtained relative to water drop occurring when washing the vehicle.

The upper and lower walls 12*e* and 12*f* of the second handle case 12 are formed to be asymmetrical to each other relative to the middle line m. Therefore, when the upper and lower lock detection electrodes 36 and 37, which respectively include the first and second electrode end surfaces 36*c* and 37*c* formed into the different shapes from each other, are arranged at the inner surfaces of the upper and lower walls 12*e* and 12*f* of the second handle case 12, the arrangement of the upper and lower lock detection electrodes 36 and 37 are not restricted by the shape of the second handle case 12. Further, the upper and lower walls 12*e* and 12*f* of the second handle case 12 do not need to be formed to be symmetrical to each other relative to the middle line m. Therefore, the door handle 10 may be more freely designed.

The surfaces of the upper ad lower walls 12*e* and 12*f* of the second handle case 12 are formed into uneven shapes (i.e., the serration 12*g*) for guiding the water drop W falling on the surfaces thereof to flow easily. Therefore, the water drop W may not cause the malfunction of the first electrostatic capacity sensor 41.

The lock detection electrode 31, which includes the first and second electrode end surfaces 36*c* and 37*c* (the upper and lower lock detection electrodes 36 and 37), is made of a metal plate and may easily be made by pressing the metal plate.

The unlock detection electrode 32 for detecting the unlocking operation of the vehicle door is arranged at the inner side of the holding portion of the door handle 10. Therefore, a command for unlocking the vehicle door is inputted in response to the holding operation of the door handle 10 by the user, who intends to open the vehicle door. Accordingly, the command for locking the vehicle door and the command for unlocking the vehicle door are appropriately distinguished. In other words, user's intention of locking/unlocking the vehicle door is more accurately detected via the first and second electrostatic capacity sensors 41 and 42.

Water proof sealing material or packing for covering at least the upper and lower lock detection electrodes 36 and 37 are not required. Further, the above-described embodiment may be modified as follows.

Figure 8:
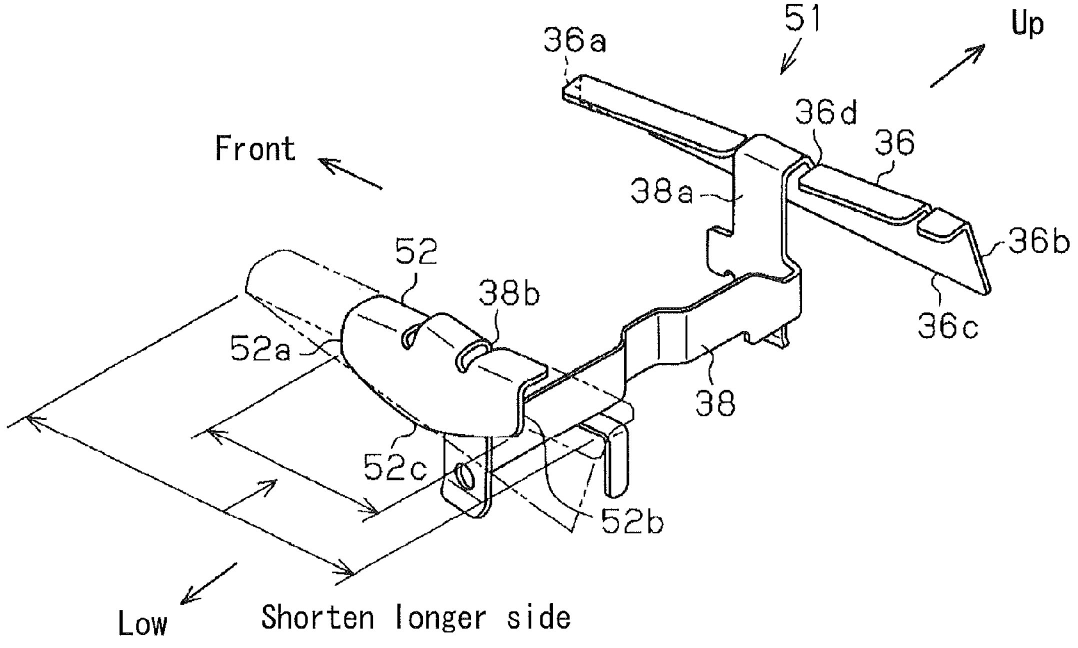
FIG. 8 is a perspective view illustrating a lock detection electrode of the door handle apparatus according to a modified embodiment.
Figure 9:
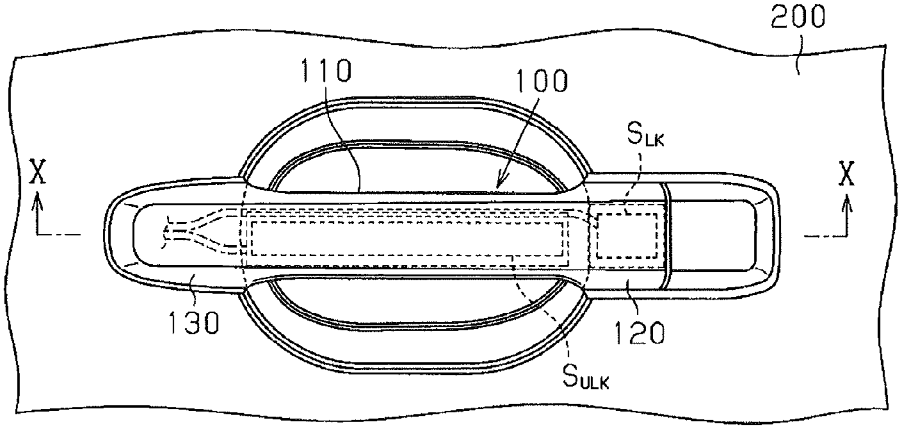
FIG. 9 Prior Art
FIG. 9 is a front view illustrating a configuration of a conventional door handle apparatus.
Figure 10:
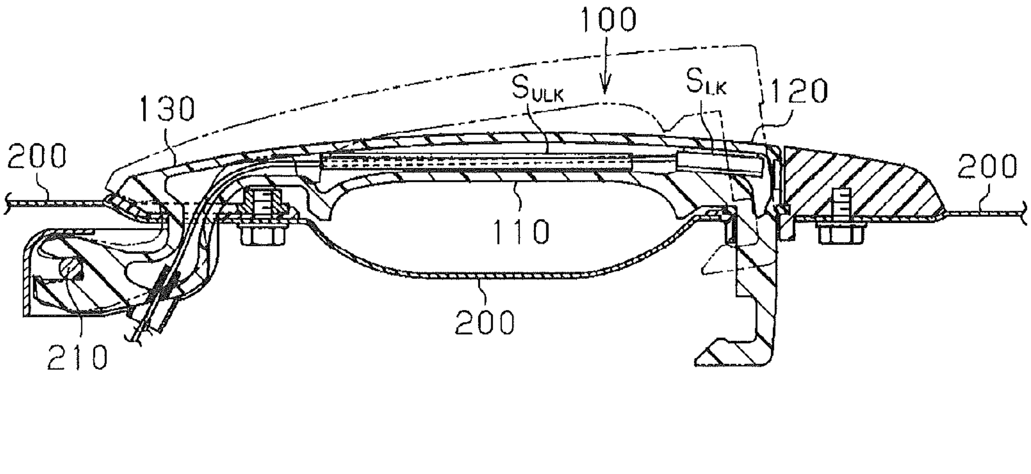
FIG. 10 Prior Art
FIG. 10 is a cross-sectional view illustrating the configuration of the conventional door handle apparatus taken along line X-X in FIG. 9.

A lock detection electrode 51 shown in FIG. 8 may be applied. More specifically, a lower lock detection electrode 52 of the lock detection electrode 51 is formed in a substantially pentagonal shape having a first short side 52*a* and a second short side 52*b* at the front and rear sides of the vehicle, respectively (i.e., the substantially pentagonal shape is formed in a manner where front and rear end portions of a substantially trapezoid shape (similar to a shape of the upper lock detection electrode 36, and illustrated by a double dashed line in FIG. 8) are cut out, and then, a substantially triangular-shaped portion is further cut out from the cutout rear end portion). In such a case, a length of a second electrode end surface 52*c*, serving as a longer side and facing the outer panel 20, of the lower lock detection electrode 52 is set to be shorter than that of the first electrode end surface 36*c* of the upper lock detection electrode 36. In other words, a dimension of the second electrode end surface 52*c* of the lower lock detection electrode 52 is set to be smaller than that of the first electrode end surface of the upper lock detection electrode 36. Consequently, a level of capacitive coupling established between the outer panel 20 and the second electrode end surface 52*c* of the lower lock detection electrode 52 is smaller than a level of capacitive coupling established between the outer panel 20 and the first electrode end surface 36*c* of the upper lock detection electrode 36 by a level corresponding to a decreased dimension of the second electrode end surfaces 52*c*. Therefore, even when the embodiment is modified, the similar effects may be obtained.

Further, the dimension of the lower lock detection electrode 37, 52 may be set to be smaller than that of the upper lock detection electrode 36 in a manner where the lower lock detection electrode 37, 52 and the upper lock detection electrode 36 are similar to each other in shape but a thickness of the lower lock detection electrode 37, 52 is set to be smaller than that of the upper lock detection electrode 36.

In the above-described embodiment, as long as the second handle case 12 does not interfere with the accommodation of the lock detection electrode 31 (the upper and lower lock detection electrodes 36 and 37), the first and second walls 12*e* and 12*f* of the second handle case 12 may be formed in to be symmetrical to each other relative to the middle line m.

According to the embodiment, the rotational-portion extending portion 12*b* and the operational-portion extending portion 12*d* are provided at the second handle case 12. However, the embodiment may be applied to a door handle, in which each of or one of the rotational-portion extending portion 12*b* and the operational-portion extending portion 12*d* is provided at the first handle case 11.

The surfaces of the upper and lower walls 12*e* and 12*f* of the second handle case 12 are formed into uneven shapes for guiding the water drop W falling on the surfaces thereof to flow easily. According to such structure, for example, malfunction of the first and second electrostatic capacity sensors 41 and 42 caused by the water drop W is restricted.

Accordingly, the lock detection electrode 31 (the upper lock detection electrode 36 and the lower lock detection electrode 37) is arranged at the inner surfaces of the upper and lower walls 12*e* and 12*f* of the second handle case 12. Therefore, the command for locking the vehicle door may not be inputted in response to the holding operation of the door handle 10 by the user. More specifically, when the user holds the upper and lower walls 12*e* and 12*f* of the second handle case 12 between his/her fingers in order to input the command for locking the vehicle door, the command for locking the vehicle door is detected because dimension of the detection area of the upper and lower lock detection electrodes 36 and 37 is sufficiently obtained. Further, because the water drop W flows from the upper to the lower portions of the door handle 10, the water drop W may easily accumulates at the lower portion of the door handle 10. However, the upper and lower lock detection electrodes 36 and 37 are formed into the different shapes from each other, so that the capacitive coupling established between the second electrode end surface 37*c* and the outer panel 20 is smaller than the capacitive coupling established between the first electrode end surface 36*c* and the outer panel 20. Therefore the water drop W is less likely to form the bridge between the outer panel 20 and the second electrode end surface 37*c*, compared to the first electrode end surface 36*c*. Accordingly, the sufficient clearance is provided for allowing the fluctuation of the electric permittivity at the shortest facing portion between the outer panel 20 and the lower lock detection electrode 37 and the fluctuation of the electrostatic capacity, which may be caused when the water drop W approaches (i.e., comes in contact with) the lower lock detection electrode 37. Thus, the water drop W is less likely to form the bridge between the outer panel 20 and the second electrode end surface 37*c*, at the lower lock detection electrode 37, which may be affected by the water drop W. Accordingly, the first electrostatic capacity sensor 41 may not malfunction due to the water drop W.

According to the embodiment, the second electrode end surface 37*c*, 52*c* of the lower lock detection electrode 37, 52 is formed so that the distance between the second electrode end surface 37*c*, 52*c* of the lower lock detection electrode 37, 52 and the outer panel 20 is set to be greater than the distance between the first electrode end surface 36*c* of the upper lock detection electrode 36 and the outer panel 20.

Accordingly, the capacitive coupling established between the second electrode end surface 37*c* of the lower lock detection electrode 37 and the outer panel 20 is set to be relatively smaller than the capacitive coupling established between the first electrode end surface 36*c* of the upper lock detection electrode 36.

According to the embodiment, the second electrode end surface 37*c*, 52*c* of the lower lock detection electrode 37, 52 is formed so that a dimension of the second electrode end surface 37*c*, 52*c* of the lower lock detection electrode 37, 52 is set to be smaller than a dimension of the first electrode end surface 36*c* of the upper lock detection electrode 36.

Accordingly, the capacitive coupling established between the second electrode end surface 37*c* of the lower lock detection electrode 37 and the outer panel 20 is set to be relatively smaller than the capacitive coupling established between the first electrode end surface 36*c* of the upper lock detection electrode 36.

According to the embodiment, the upper wall 12*e* and the lower wall 12*f* of the second handle case 12 are formed to be asymmetrical to each other relative to a middle line m, extending from the rotational-portion extending portion 12*b* to the operational-portion extending portion 12*d*.

Accordingly, when the upper and lower lock detection electrodes 36 and 37, which respectively include the first and second electrode end surfaces 36*c* and 37*c* formed into the different shapes from each other, are arranged at the inner surfaces of the upper and lower walls 12*e* and 12*f* of the second handle case 12, the arrangement of the upper and lower lock detection electrodes 36 and 37 is not restricted by the shape of the second handle case 12.

According to the embodiment, the upper lock detection electrode 36 and the lower lock detection electrode 37, 52 are integrally formed via a connecting portion 38.

According to the embodiment, the upper lock detection electrode 36 and the lower lock detection electrode 37, 52 are integrally formed by pressing a metal plate.

Accordingly, an operational error by a user is restricted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A door handle apparatus for a vehicle comprising:

a door handle including a first handle case and a second handle case, the first handle case having a holding portion for holding the door handle, the holding portion being arranged to be distant from an outer surface of an outer panel of a vehicle door by a clearance, the second handle case serving as an outer portion of the door handle and being arranged to cover the first handle case;

a rotational-portion extending portion provided in the vicinity of one end portion of the door handle in a longitudinal direction thereof and extending into the outer panel after passing therethrough to connect a rotational portion that is rotatably supported by a supporting member inside the outer panel; and an operational-portion extending portion formed in the vicinity of the other end portion of the door handle in the longitudinal direction thereof and extending into the outer panel after passing therethrough to connect an operational portion operating an opening and closing mechanism of the vehicle door, the operational-portion extending portion being provided with a lock detection electrode of an electrostatic capacity sensor, the lock detection electrode being arranged to face an inner surface of the second handle case facing the outer panel, the electrostatic capacity sensor detecting that a door lock command is inputted, on the basis of a fluctuation of electrostatic capacity, wherein the lock detection electrode includes an upper lock detection electrode and a lower lock detection electrode arranged to face an inner surface of an upper wall of the second handle case facing the outer panel and an inner surface of a lower wall of the second handle case facing the outer panel, respectively, wherein the upper lock detection electrode establishes a first capacitive coupling with the outer panel and the lower lock detection electrode establishes a second capacitive coupling with the outer panel, and wherein a first electrode end surface of the upper lock detection electrode and a second electrode end surface of the lower lock detection electrode, each of which faces the outer panel, are formed into different shapes from each other, so that a level of the second capacitive coupling established between the lower lock detection electrode and the outer panel is set to be smaller than a level of the first capacitive coupling established between the upper lock detection electrode and the outer panel.

2. The door handle apparatus according to claim 1, wherein the second electrode end surface of the lower lock detection electrode is formed so that a distance between the second electrode end surface of the lower lock detection electrode and the outer panel is set to be greater than a distance between the first electrode end surface of the upper lock detection electrode and the outer panel.

3. The door handle apparatus according to claim 1, wherein the second electrode end surface of the lower lock detection electrode is formed so that a dimension of the second electrode end surface of the lower lock detection electrode is set to be smaller than a dimension of the first electrode end surface of the upper lock detection electrode.

4. The door handle apparatus according to claim 1, wherein the upper wall and the lower wall of the second handle case are formed to be asymmetrical to each other with respect to a middle line extending from the rotational-portion extending portion to the operational-portion extending portion.

5. The door handle apparatus according to claim 1, wherein the upper lock detection electrode and the lower lock detection electrode are integrally formed via a connecting portion.

6. The door handle apparatus according to claim 5, wherein the upper lock detection electrode and the lower lock detection electrode are integrally formed by pressing a metal plate.

* * * * *